United States Patent
Byun

(10) Patent No.: US 11,269,765 B2
(45) Date of Patent: Mar. 8, 2022

(54) OPERATING METHOD OF CONTROLLER AND MEMORY SYSTEM

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 9 days.

(21) Appl. No.: 16/707,851

(22) Filed: Dec. 9, 2019

(65) Prior Publication Data
US 2020/0387445 A1    Dec. 10, 2020

(30) Foreign Application Priority Data
Jun. 4, 2019    (KR) .................. 10-2019-0065945

(51) Int. Cl.
G06F 12/02    (2006.01)
G06F 12/0882    (2016.01)
G06F 3/06    (2006.01)

(52) U.S. Cl.
CPC ........ *G06F 12/0246* (2013.01); *G06F 3/0614* (2013.01); *G06F 3/0647* (2013.01); *G06F 3/0679* (2013.01); *G06F 12/0882* (2013.01); G06F 2212/7201 (2013.01)

(58) Field of Classification Search
None
See application file for complete search history.

(56) References Cited

U.S. PATENT DOCUMENTS

| 5,459,850 | A  | 10/1995 | Clay et al. |
| 9,164,888 | B2 | 10/2015 | Borchers et al. |
| 9,195,396 | B2 | 11/2015 | Peterson et al. |
| 9,378,135 | B2 | 6/2016  | Bennett |

(Continued)

FOREIGN PATENT DOCUMENTS

| KR | 10-1366960 B1   | 2/2014 |
| KR | 10-2015-0114958 A | 10/2015 |

(Continued)

OTHER PUBLICATIONS

Jeong, W et al., Improving Flash Storage Performance by Caching Address Mapping Table in Host Memory, Jul. 12-14, 2017, HotStorage '17, Santa Clara, CA.

(Continued)

*Primary Examiner* — Michael Alsip
(74) *Attorney, Agent, or Firm* — IP & T Group LLP

(57) ABSTRACT

Various embodiments generally relate to a semiconductor device, and more particularly, to an operating method of a controller and a memory system. In accordance with an embodiment of the present disclosure, an operating method of a controller for controlling a nonvolatile memory device including a plurality of memory blocks may include: generating High Performance Booster (HPB) data based on Logical to Physical (L2P) map data and storing the HPB data into at least one empty page included in a first memory block; assigning a second memory block when a number of empty pages included in the first memory block becomes smaller than a threshold number; and migrating HPB data, which is selected according to a predetermined criterion among the HPB data stored in the first memory block, into the second memory block, wherein at least a part of the HPB data is cached into a memory of a host.

9 Claims, 12 Drawing Sheets

(56) References Cited

U.S. PATENT DOCUMENTS

| | | |
|---|---|---|
| 9,400,749 B1 | 7/2016 | Kuzmin et al. |
| 10,108,366 B2 | 10/2018 | Huang et al. |
| 10,126,982 B1 | 11/2018 | Colgrove et al. |
| 10,409,511 B1 | 9/2019 | Subbarao et al. |
| 10,558,393 B2 | 2/2020 | Shin et al. |
| 2008/0313405 A1 | 12/2008 | Sakata et al. |
| 2009/0013149 A1 | 1/2009 | Uhlig et al. |
| 2010/0185883 A1 | 7/2010 | Hamilton |
| 2011/0219106 A1 | 9/2011 | Wright |
| 2011/0231623 A1 | 9/2011 | Goss et al. |
| 2014/0052898 A1 | 2/2014 | Nan |
| 2014/0089761 A1 | 3/2014 | Kwok |
| 2014/0244897 A1* | 8/2014 | Goss ................. G06F 12/0238 711/103 |
| 2016/0246726 A1 | 8/2016 | Hahn |
| 2016/0259723 A1 | 9/2016 | Lee et al. |
| 2016/0299715 A1 | 10/2016 | Hashimoto et al. |
| 2016/0342509 A1 | 11/2016 | Kotte et al. |
| 2017/0039141 A1 | 2/2017 | Yeh et al. |
| 2017/0083436 A1 | 3/2017 | Jung |
| 2017/0192902 A1 | 7/2017 | Hwang et al. |
| 2018/0004413 A1 | 1/2018 | Zhang |
| 2018/0225176 A1 | 8/2018 | Kim et al. |
| 2018/0275873 A1 | 9/2018 | Frid et al. |
| 2018/0322042 A1 | 11/2018 | Jang |
| 2019/0089383 A1 | 3/2019 | Funaoka et al. |
| 2019/0102291 A1 | 4/2019 | Zhou |
| 2019/0121540 A1 | 4/2019 | Shin et al. |
| 2019/0227929 A1 | 7/2019 | Lin et al. |
| 2019/0243773 A1 | 8/2019 | Li |
| 2019/0258585 A1 | 8/2019 | Marcu et al. |
| 2019/0266079 A1* | 8/2019 | R .......................... G06F 3/064 |
| 2019/0332542 A1 | 10/2019 | Li et al. |
| 2019/0377647 A1 | 12/2019 | Rao et al. |
| 2020/0004701 A1 | 1/2020 | Subbarao et al. |
| 2020/0034307 A1 | 1/2020 | Duzly et al. |
| 2020/0092194 A1 | 3/2020 | Tillotson et al. |
| 2020/0151108 A1 | 5/2020 | Yen et al. |
| 2020/0210344 A1 | 7/2020 | Manganelli et al. |
| 2020/0371908 A1 | 11/2020 | Cariello |
| 2020/0409584 A1 | 12/2020 | Matsumoto et al. |

FOREIGN PATENT DOCUMENTS

| | | |
|---|---|---|
| KR | 101631039 | 6/2016 |
| KR | 10-2017-0002866 A | 1/2017 |
| KR | 1020170005915 | 1/2017 |
| KR | 101736647 | 5/2017 |
| KR | 101867487 | 7/2018 |
| KR | 10-2020-0116704 A | 10/2020 |
| WO | 2014/120698 A1 | 8/2014 |

OTHER PUBLICATIONS

Office Action issued by the USPTO for U.S. Appl. No. 16/721,716 dated Apr. 1, 2021.

Office Action issued by the USPTO for U.S. Appl. No. 16/733,867 dated Jun. 14, 2021.

Office Action issued by the USPTO of U.S. Appl. No. 16/721,716 dated Aug. 6, 2021.

Office Action issued by the USPTO of U.S. Appl. No. 16/599,870 dated Sep. 1, 2021.

Office Action issued by the USPTO of U.S. Appl. No. 16/733,900 dated Sep. 14, 2021.

Office Action issued by the USPTO for U.S. Appl. No. 16/733,867 dated Oct. 8, 2021.

Office Action issued by the USTPO dated Nov. 24, 2021.

* cited by examiner

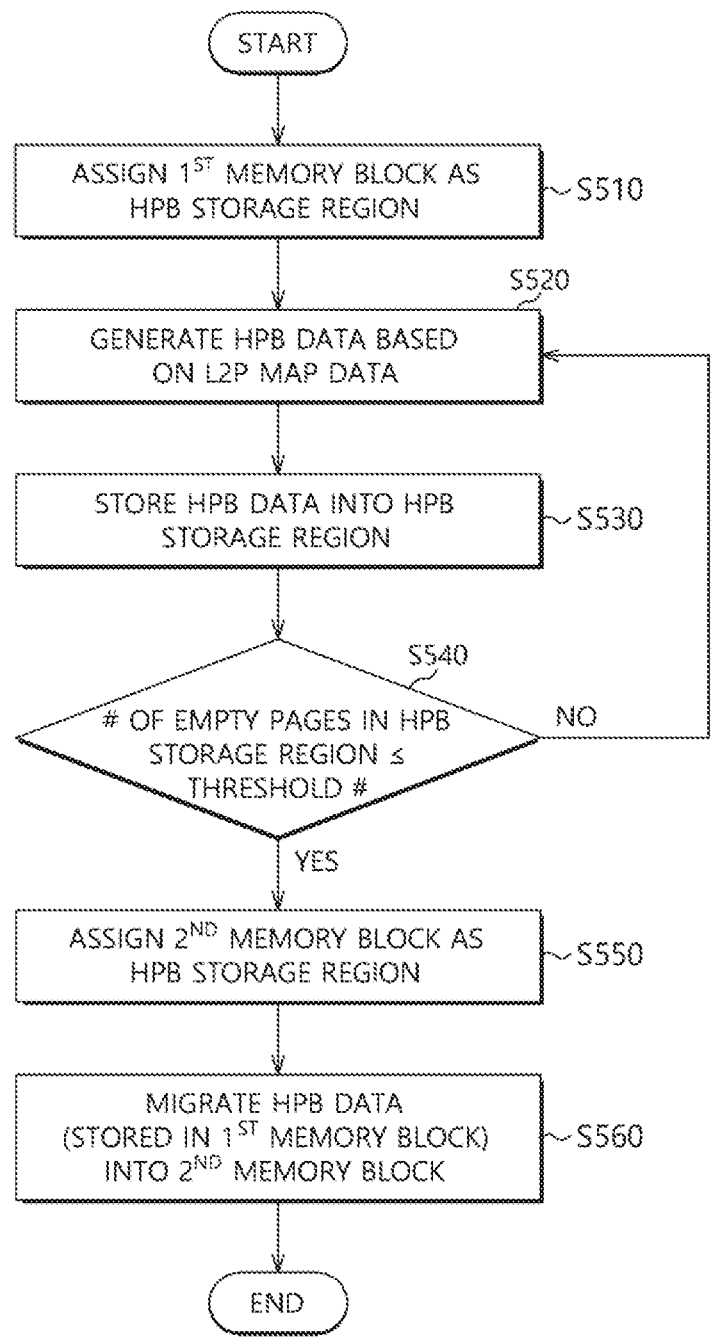

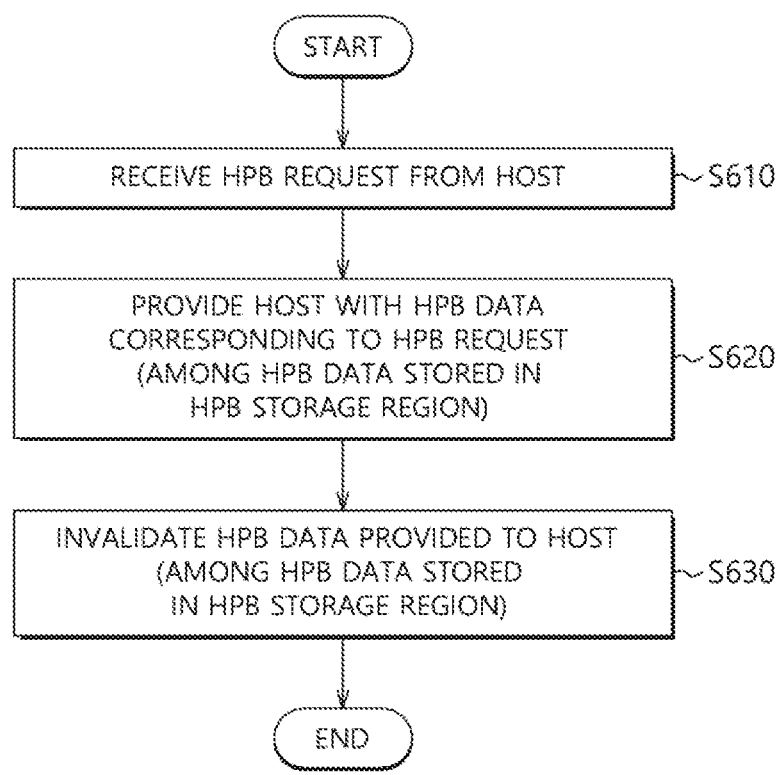

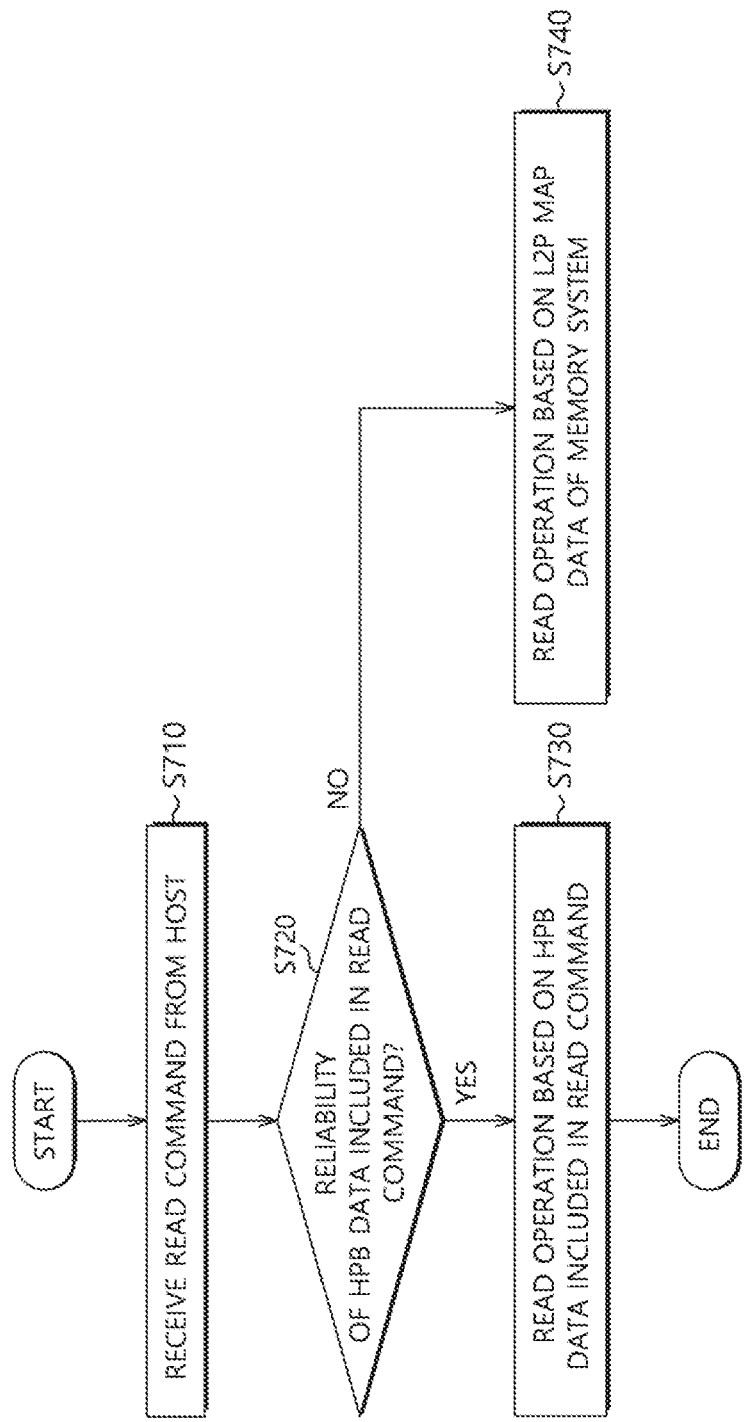

OPERATING METHOD OF CONTROLLER AND MEMORY SYSTEM

CROSS-REFERENCE TO RELATED APPLICATION

The present application claims priority under 35 U.S.C. § 119(a) to Korean application number 10-2019-0065945, filed on Jun. 4, 2019, in the Korean Intellectual Property Office, which is incorporated herein by reference in its entirety.

BACKGROUND

1. Technical Field

Various embodiments generally relate to a semiconductor device, and more particularly, to an operating method of a controller and a memory system.

2. Related Art

Recently, the paradigm for the computing environment has changed to ubiquitous computing in which computer systems can be used anytime anywhere. Therefore, the use of portable electronic devices such as mobile phones, digital cameras and notebook computers has rapidly increased. Any such portable electronic device generally uses a memory system employing a memory device. The memory system is used to store data used in the portable electronic device.

Since a memory system with a memory device has no mechanical driver, the associated data storage device has excellent stability and durability, high information access speed, and low power consumption. Examples of a memory system having such advantages include a universal serial bus (USB) memory device, a memory card having various interfaces, a universal flash storage (UFS) device, and a solid state drive (SSD).

SUMMARY

Various embodiment of the present disclosure provides a technology capable of improving the performance of a memory system.

In accordance with an embodiment of the present disclosure, an operating method of a controller for controlling a nonvolatile memory device including a plurality of memory blocks may include: generating High Performance Booster (HPB) data based on Logical to Physical (L2P) map data and storing the HPB data in at least one empty page in a first memory block; assigning a second memory block as a migration destination, when a number of empty pages in the first memory block becomes less than a threshold number; and migrating HPB data, which is selected according to a set criterion among the HPB data stored in the first memory block, to the second memory block, wherein at least a part of the HPB data is cached in a memory of a host.

In accordance with an embodiment of the present disclosure, a memory system may include: a nonvolatile memory device including a plurality of memory blocks; and a controller configured to control the nonvolatile memory device, wherein the controller is further configured to: generate High Performance Booster (HPB) data based on Logical to Physical (L2P) map data and store the HPB data into at least one empty page in a first memory block; assigning a second memory block as a migration destination, when a number of empty pages in the first memory block becomes less than a threshold number; and migrating HPB data, which is selected according to a set criterion among the HPB data stored in the first memory block, into the second memory block, wherein at least a part of the HPB data is cached into a memory of a host.

In accordance with an embodiment of the present disclosure, an operating method of a memory system may include: storing, in a first memory block in the memory system, high performance booster (HPB) data generated based on logical to physical (L2P) map data; invalidating, in the first memory block, at least some of the HPB map data, which is provided to a host for caching in the host; performing an operation based on a physical address, which is retrieved from the HPB data cached in the host, in response to a request from the host; and migrating at least a portion of the valid HPB data from the first memory block to a second memory block.

BRIEF DESCRIPTION OF THE DRAWINGS

Features, aspects and embodiments are described in conjunction with the attached drawings, in which:

FIGS. 2 to 8B are schematic diagrams illustrating an operation of a memory system in accordance with an embodiment of the present disclosure;

DETAILED DESCRIPTION

A semiconductor apparatus is described below with reference to the accompanying drawings through various embodiments. Throughout the specification, reference to "an embodiment," "another embodiment" or the like is not necessarily to only one embodiment, and different references to any such phrase are not necessarily to the same embodiment(s). Similarly, reference to an element in the singular form does not preclude multiple instances of that element, unless stated or the context indicates otherwise. To that end, the indefinite articles "a" and "an" generally mean one or more, unless state or the context indicates that only one is intended.

Figure 1:
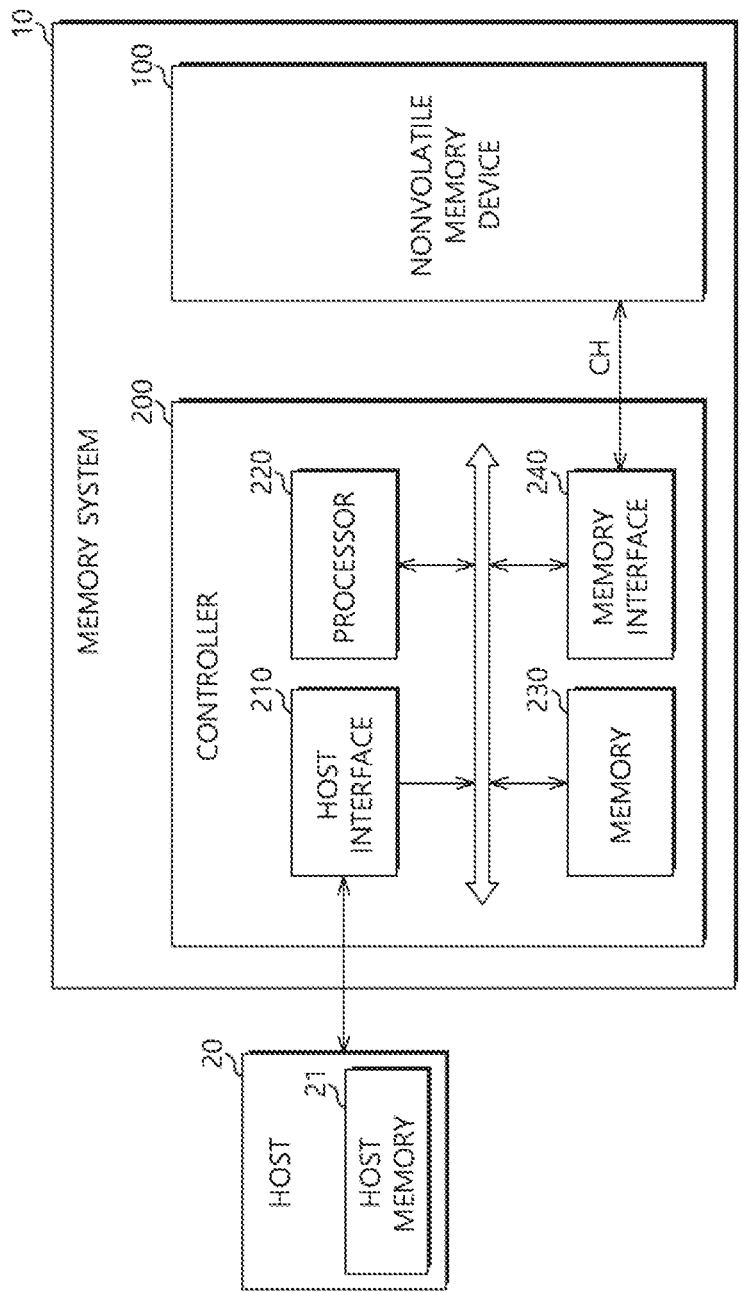
FIG. 1 is a diagram illustrating a configuration of a memory system in accordance with an embodiment of the present disclosure.

FIG. 1 is a diagram illustrating a configuration of a memory system 10 in accordance with an embodiment of the present disclosure.

Referring to FIG. 1, the memory system 10 according to an embodiment may store data to be accessed by a host 20, which may be, for example, a mobile phone, an MP3 player, a laptop computer, a desktop computer, a game player, a television (TV), and/or an in-vehicle infotainment system.

The memory system 10 may be configured as any of various types of storage devices according to an interface protocol coupled to the host 20. For example, the memory system 10 may be configured as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-E), a compact flash (CF) card, a smart media card, and/or a memory stick.

The memory system 10 may be manufactured as any of various types of packages. For example, the memory system 10 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory system 10 may include a nonvolatile memory device 100 and a controller 200.

The nonvolatile memory device 100 may operate as a storage medium of the memory system 10. According to the type of memory cells configuring the nonvolatile memory device 100, the nonvolatile memory device 100 may be implemented as any of various nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and/or a resistive random access memory (ReRAM) using a transition metal compound.

Although FIG. 1 exemplifies the memory system 10 as including a single nonvolatile memory device 100, such representation is for clarity. In another embodiment, the memory system 10 may include a plurality of nonvolatile memory devices 100 that may be configured and operated consistent with the teachings herein.

The nonvolatile memory device 100 may include a memory cell array (not shown) including a plurality of memory cells arranged at intersections of word lines (not shown) and bit lines (not shown). The memory cell array may include a plurality of memory blocks each including a plurality of pages.

For example, each of the memory cells in the memory cell array may be a single level cell (SLC) capable of storing 1-bit data or a multi-level cell (MLC) capable of storing data of 2 or more bits. The designation MLC may refer more specifically to memory cell capable of storing 2-bit data, in which case a memory cell capable of storing 3-bit data may be referred to as a triple level cell (TLC), and a memory cell capable of storing 4-bit data may be referred to as a quadruple level cell (QLC). Below, MLC is used in its more general sense to refer to any memory cell capable of storing data of 2 or more bits.

The memory cells in the memory cell array may be arranged in a two-dimensional (e.g., horizontal) structure or in a three-dimensional (e.g., vertical) structure.

The controller 200 may include a host interface 210, a processor 220 and a memory interface 240. The controller 200 may control general operations of the memory system 10 by driving firmware or software loaded in the memory 230. The controller 200 may decode and drive instructions or algorithms of a code type such as firmware or software. The controller 200 may be implemented as hardware or combination of hardware and software. Although not illustrated in FIG. 1, the controller 200 may further include an error correction code (ECC) engine configured to generate parity information by ECC-encoding write data provided from the host 20 and to ECC-decode data read from the nonvolatile memory device 100 using the parity information.

The host interface 210 may interface the host 20 and the memory system 10 according to a protocol of the host 20. For example, the host interface 210 may communicate with the host 20 through any of various protocols including a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The processor 220 may comprise a micro control unit (MCU) and/or a central processing unit (CPU). The processor 220 may process requests transmitted from the host 20. To process such requests, the processor 220 may drive a code-typed instruction or algorithm (for example, firmware) loaded into the memory 230 and control internal function blocks such as the host interface 210, the memory 230 and the memory interface 240 and the nonvolatile memory device 100.

The processor 220 may generate control signals for controlling operations of the nonvolatile memory device 100 based on the requests transmitted from the host 20 and may provide the generated control signals to the nonvolatile memory device 100 through the memory interface 240.

The memory 230 may be configured as a read only memory (ROM) or a random access memory such as a dynamic random access memory (DRAM) or a static random access memory (SRAM). The memory 230 may store the firmware to be driven by the processor 220. The memory 230 may also store data (for example, meta data) for driving of the firmware. That is, the memory 230 may operate as a working memory of the processor 220.

The memory 230 may include a data buffer configured to temporarily store write data to be transmitted to the nonvolatile memory device 100 from the host 20 or read data to be transmitted to the host 20 from the nonvolatile memory device 100. That is, the memory 230 may operate as a buffer memory of the processor 220.

As those skilled in the art will appreciate, the memory 230 may include regions for various purposes such as a region for a write data buffer configured to temporarily store write data, a region for a read data buffer configured to temporarily store read data, and a region for a map cache buffer configured to cache map data.

Also, the memory 230 may store system data or meta data.

When the nonvolatile memory device 100 is implemented as a flash memory device, the processor 220 may drive software referred to as a flash translation layer (FTL) in order to control an intrinsic operation of the nonvolatile memory device 100 and provide device compatibility to the host 20. As the FTL is driven, the host 20 may regard and use the memory system 10 as a general storage device such as a hard disk.

The memory interface 240 may control the nonvolatile memory device 100 according to the control of the processor 220. The memory interface 240 may be referred to as a memory controller. The memory interface 240 may provide control signals to the nonvolatile memory device 100. The control signals may include a command, an address, and an operation control signal, and the like for controlling the nonvolatile memory device 100. The memory interface 240 may provide the nonvolatile memory device 100 with data stored in the data buffer or store data transmitted from the nonvolatile memory device 100 in the data buffer.

The controller 200 may further include a first memory (not illustrated) directly coupled to the processor 220. The processor 220 may load firmware from the memory 230 into the first memory and may drive the firmware loaded onto the first memory. In an embodiment, the first memory may be external to the controller 200.

Figure 2:
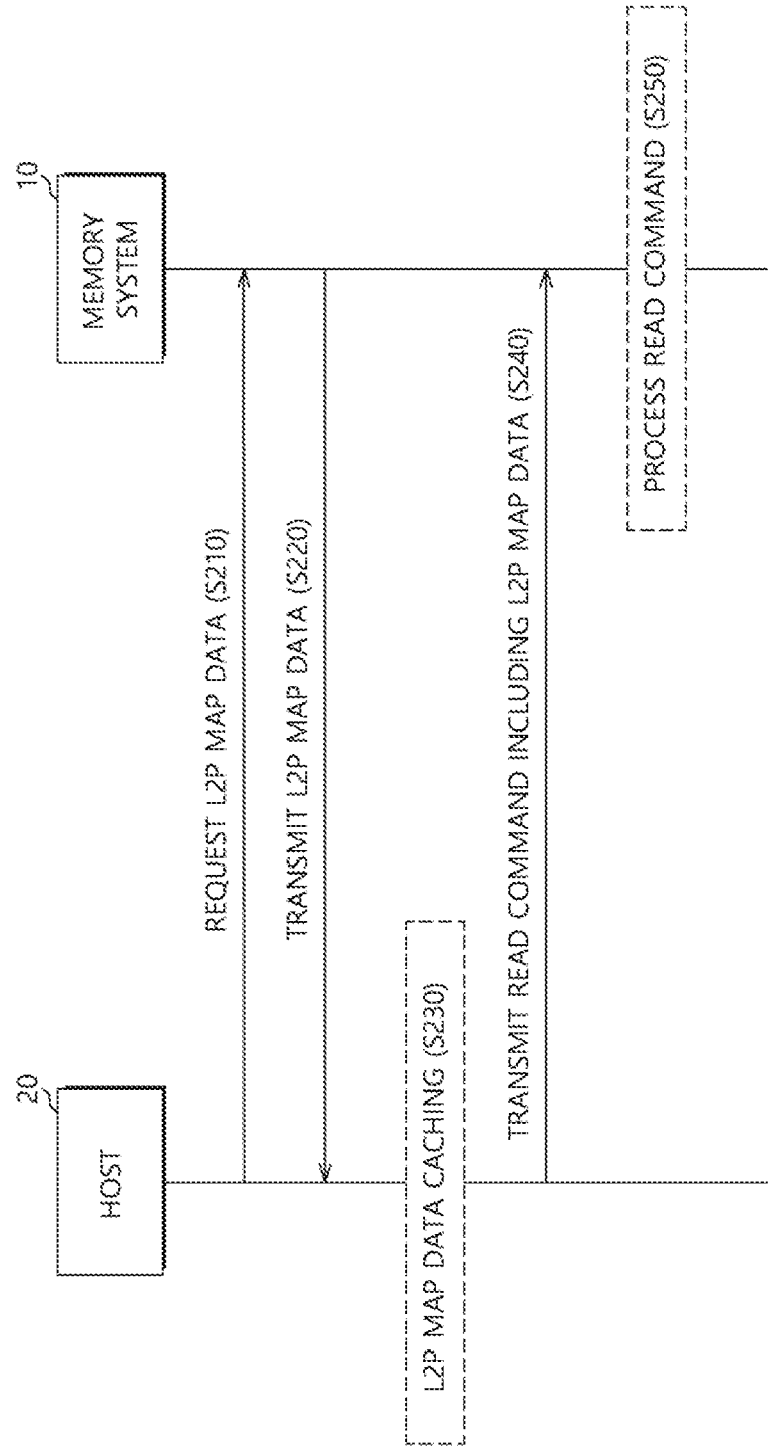

FIG. 2 is a diagram illustrating a memory system utilizes a memory resource of a host in accordance with an embodiment of the present disclosure.

Referring to FIG. 2, in step S210, the host 20 may request, from the memory system 10, all or some of a plurality of logical-to-physical (L2P) map data pieces stored in the memory system 10. Each piece of L2P map data may represent a mapping relationship between a logical address and a physical address, the logical address utilized by the host 20 to access the nonvolatile memory device 100 and the physical address utilized by the memory system 10 to access the nonvolatile memory device 100.

In an embodiment the host 20 may request, when a booting operation of the memory system 10 is completed, the L2P map data from the memory system 10.

In an embodiment, the host 20 may request, from the memory system 10, L2P map data corresponding to a specific workload among a plurality of pieces of L2P map data stored in the memory system 10.

In an embodiment, the host 20 may request, from the memory system 10, all or some of a plurality of pieces of L2P map data stored in the nonvolatile memory device 100.

In an embodiment, the host 20 may request, from the memory system 10, all or some of a plurality of pieces of L2P map data stored in the memory 230 of the controller 200.

In step S220, the memory system 10 may transmit, to the host 20, the L2P map data requested by the host 20.

In an embodiment, the memory 230 of the controller 200 may include a DRAM configured to store the plurality of pieces of L2P map data received from the nonvolatile memory device 100 and a SRAM configured to cache at least some of the plurality of pieces of L2P map data stored in the DRAM.

In an embodiment, the memory system 10 may transmit, to the host 20, all or some of the plurality of pieces of L2P map data stored in the memory 230 of the controller 200.

In an embodiment, the memory system 10 may read all or some of the plurality of pieces of L2P map data stored in the nonvolatile memory device 100 and may transmit the read pieces of L2P map data to the host 20.

In step S230, the host 20 may receive the L2P map data from the memory system 10 and may cache the received L2P map data into the host memory 21.

In step S240, when data stored in the memory system 10 is requested, the host 20 may generate a read command and may transmit the generated read command to the memory system 10. The read command may include L2P map data having address information, which corresponds to the requested data, among the L2P map data cached in the host memory 21.

In step S250, the memory system 10 may receive the read command and may perform a read operation of reading the data stored in the nonvolatile memory device 100 according to the received read command.

In an embodiment, the memory system 10 may read the data stored in the nonvolatile memory device 100 based on the L2P map data included in the read command.

In an embodiment, the memory system 10 may read the data stored in the nonvolatile memory device 100 based on the L2P map data cached in the memory 230 instead of the L2P map data included in the read command.

That is, the memory system 10 may cache the L2P map data into the host memory 21, which has a relatively large storage capacity, and may process the read command according to the L2P map data cached in the host memory 21. Therefore, the memory system 10 may be Improved in operation performance since storage capacity of the memory 230 that would otherwise be used for caching the L2P map data into the memory system 10 can be saved, and there is no need of referring to the L2P map data cached in the memory system 10 when processing the read command.

Although FIG. 2 illustrates L2P map data as a whole, as indicated above the L2P map data can be cached into the host memory 21 in pieces, each of which may be a unit of a L2P segment.

Figure 3:
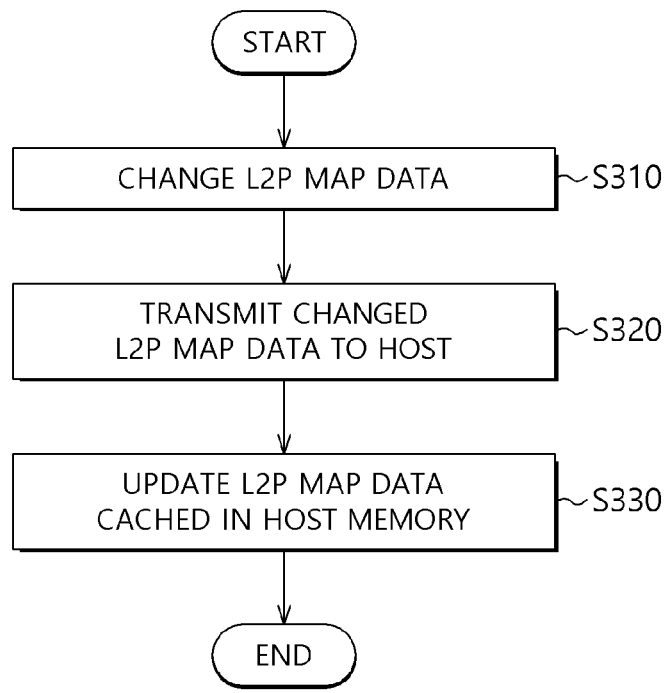
Figure 4:
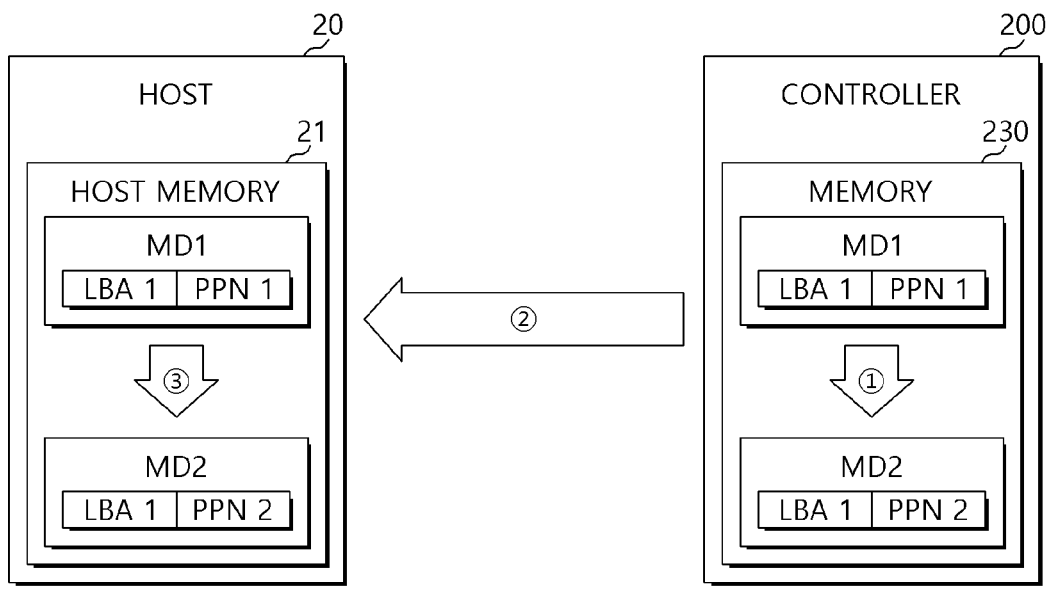

FIGS. 3 and 4 are diagrams illustrating an operation of a memory system in accordance with an embodiment of the present 1o disclosure.

It is assumed that L2P map data MD1 is cached in the host memory 21 according to the operation illustrated in FIG. 2.

Referring to FIGS. 3 and 4, in step S310, the memory system may change the L2P map data MD1 stored in the memory 230. For example, the controller 200 may store data, which is originally stored in a storage location indicated by the physical page number PPN1, in a storage location indicated by a physical page number PPN2 by performing an operation to cause a map data change event such as a garbage collection operation, a read reclaim operation, data update operation or the like. As illustrated in FIG. 4, the L2P map data MD1 may change to L2P map data MD2 to reflect a change in the mapping relationship such data represents, since the physical page number PPN1, which is mapped to the logical block address LBA1 in MD1, is changed to the physical page number PPN2 (①). In this case, since the logical block address LBA1 of MD1 cached in the host memory 21 still has the mapping relationship with the physical page number PPN1, a sync-up operation is required to be performed to synchronize MD1 cached in the host memory 21 with MD2 stored in the controller 200.

In an embodiment, the memory system 10 may inform the host 20 of the change from the L2P map data MD1 to the L2P map data MD2.

In an embodiment, the host 20 may request, from the memory system 10, sync-up of the L2P map data MD1 cached in the host memory 21.

In an embodiment, the host 20 may transmit, when informed of the change from MD1 to MD2 by the memory system 10, a sync-up request to the memory system 10.

In step S320 the memory system 10 may transmit, when the sync-up request is received from the host 20, all or some of a plurality of pieces of changed L2P map data to the host 20. That is, as illustrated in FIG. 4, the controller 200 may transmit, to the host 20, the L2P map data MD2 stored in the memory 230 (②).

In step S330, the host 20 may receive the L2P map data MD2 from the controller 200. The host 20 may update the L2P map data MD1 cached in the host memory 21 based on the L2P map data MD2 (③). That is, the mapping relationship represented by the L2P map data MD1 cached in the host memory 21 may be changed such that the physical page number PPN1 mapped to the logical block address LBA1 is changed to the physical page number PPN2.

Although FIGS. 3 and 4 illustrate L2P map data as a whole, as indicated above the update in the host memory 21 may be performed on a piece basis, where each piece is a unit of a L2P segment.

FIG. 5 is a diagram illustrating an operation of a memory system, e.g., memory system 10, in accordance with an embodiment of the present disclosure.

Referring to FIG. 5, in step S510, the memory system 10 may assign a High Performance Booster (HPB) storage region for storing HPB data. For example, the controller 200 may assign at least one first memory block as an HPB storage region among a plurality of memory blocks included in the nonvolatile memory device 100.

In step S520, the memory system 10 may generate HPB data. For example, the controller 200 may generate HPB data including L2P map data. For example, the controller 200 may generate HPB data by adding a reliability bit to the L2P map data. The reliability bit may indicate reliability of the L2P map data, which reliability indicates whether or not the L2P map data has been changed. The controller 200 may utilize, when HPB data is received from the host 20, the reliability bit in the received HPB data to determine whether the received L2P map data has changed.

In step S530, the memory system 10 may store HPB data into the HPB storage region. For example, the controller 200 may store, when the first memory block is assigned as the HPB storage region, HPB data into an empty page in the first memory block.

In step S540, the memory system 10 may determine a number of empty pages in the HPB storage region. For example, the controller 200 may determine whether the number of empty pages included in the HPB storage region is less than a set threshold number.

In step S550, the memory system 10 may assign another HPB storage region. For example, the controller 200 may assign, when the number of empty pages in the first memory block assigned as the HPB storage region is less than a set threshold number, a second memory block as the HPB storage region.

In step S560, the memory system 10 may perform a migration operation between the initially assigned HPB storage region and the additionally assigned HPB storage region. For example, the controller 200 may perform, when the second memory block is assigned as the additional HPB storage region, a migration operation of moving, into the second memory block, a selected piece (or pieces) of HPB data among a plurality of pieces of HPB data stored in the first memory block.

In an embodiment, the controller 200 may migrate, to the second memory block, a piece of HPB data that is generated on the basis of L2P map data having a high reference frequency among a plurality of pieces of HPB data stored in the first memory block. For this, the controller 200 may count a number of times the L2P map data is referenced and may store that number in the memory 230. Based on the number of references to the L2P map data, the controller 200 may migrate, to the second memory block, a piece (or pieces) of HPB data corresponding to the L2P map data having a high reference frequency among a plurality of pieces of HPB data stored in the first memory block.

In an embodiment, the controller 200 may migrate, to the second memory block, a piece of HPB data that is most recently generated among a plurality of pieces of HPB data stored in the first memory block.

In an embodiment, the controller 200 may migrate, to the second memory block, a valid piece of HPB data among a plurality of pieces of HPB data stored in the first memory block.

FIG. 6 is a diagram illustrating an operation of the memory system 10 in accordance with an embodiment of the present disclosure.

Operations of the memory system 10 described hereinafter with reference to FIG. 6 may be performed simultaneously with, prior to or subsequently to any of the steps of the memory system 10 described with reference to FIG. 5.

Referring to FIG. 6, in step S610, the memory system 10 may receive an HPB request from the host 20.

In step S620, the memory system 10 may transmit, to the host 20, a piece (or pieces) of HPB data corresponding to the HPB request among a plurality of pieces of HPB data stored in the HPB storage region (e.g., the first memory block). At this time, the host 20 may cache, into the host memory 21, the piece(s) of HPB data received from the memory system 10. That is, at least one of a plurality of pieces of HPB data stored in the memory system 10 may be cached into the host memory 21.

In step S630, the memory system 10 may invalidate a page storing the piece(s) of HPB data transmitted to the host 20. The piece(s) of HPB data stored in the invalidated page may be excluded from a target of the migration operation from the initially assigned HPB storage region to the later assigned HPB storage region (e.g., from the first to second memory blocks).

FIG. 7 is a diagram illustrating an operation of a memory system, e.g., memory system 10, in accordance with an embodiment of the present disclosure.

FIG. 7 illustrates the operation of the memory system 10 after completion of the operation described with reference to FIG. 6.

Referring to FIG. 7, in step S710, the memory system 10 may receive a read command from the host 20. The read command may include HPB data for data to be read from the nonvolatile memory device 100. The HPB data included in the read command may be that cached in the host memory 21.

In step S720, the memory system 10 may determine the reliability of the HPB data included in the read command received from the host 20.

In an embodiment, the controller 200 utilize the reliability bit included in the received HPB data to determine whether the received HPB data is reliable (e.g., whether the HPB data has been changed). For example, when a piece of L2P map data has been changed in the memory system 10 but the change is not yet reflected in the host 20, the reliability bit in the HPB data corresponding to the changed L2P map data in the memory system 10 may have a different value than that of the HPB data in the host 20.

In step S730, the memory system 10 may perform, when the HPB data in the read command is determined to be reliable, a read operation based on the HPB data included in the read command. For example, the controller 200 may control the nonvolatile memory device 100 to perform a read operation based on the L2P map data in the HPB data in the read command.

In step S740, the memory system 10 may control, when the HPB data in the read command is determined not to be reliable, the 1o nonvolatile memory device 100 to perform a read operation based on the L2P map data stored in the memory system 10 without utilizing the HPB data in the read command.

Figure 8A:
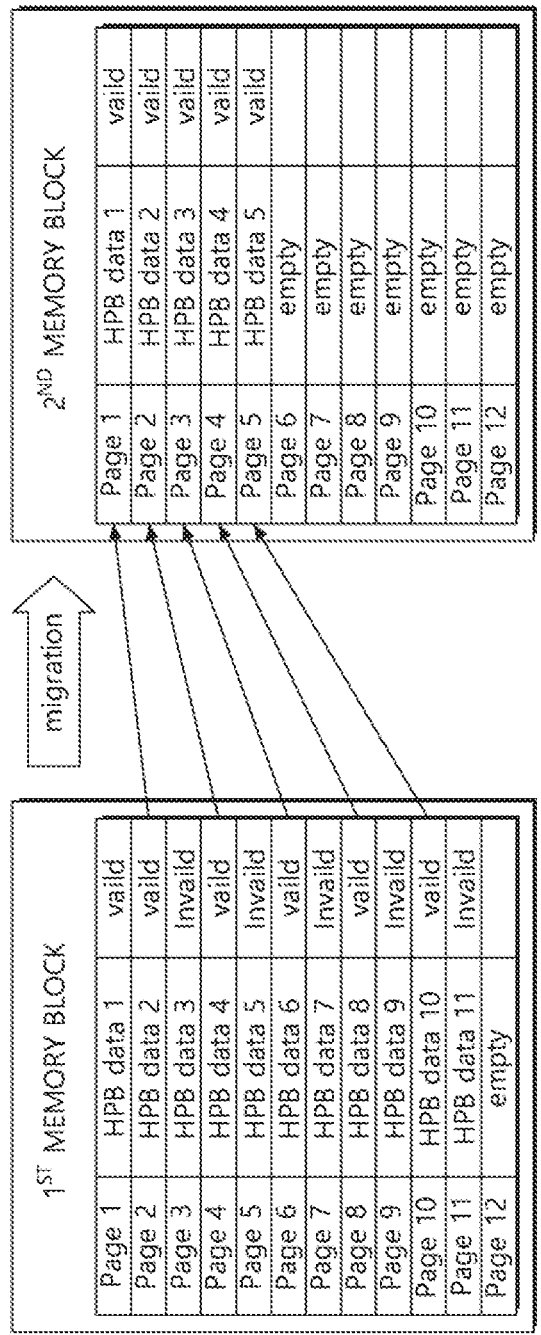
Figure 8B:
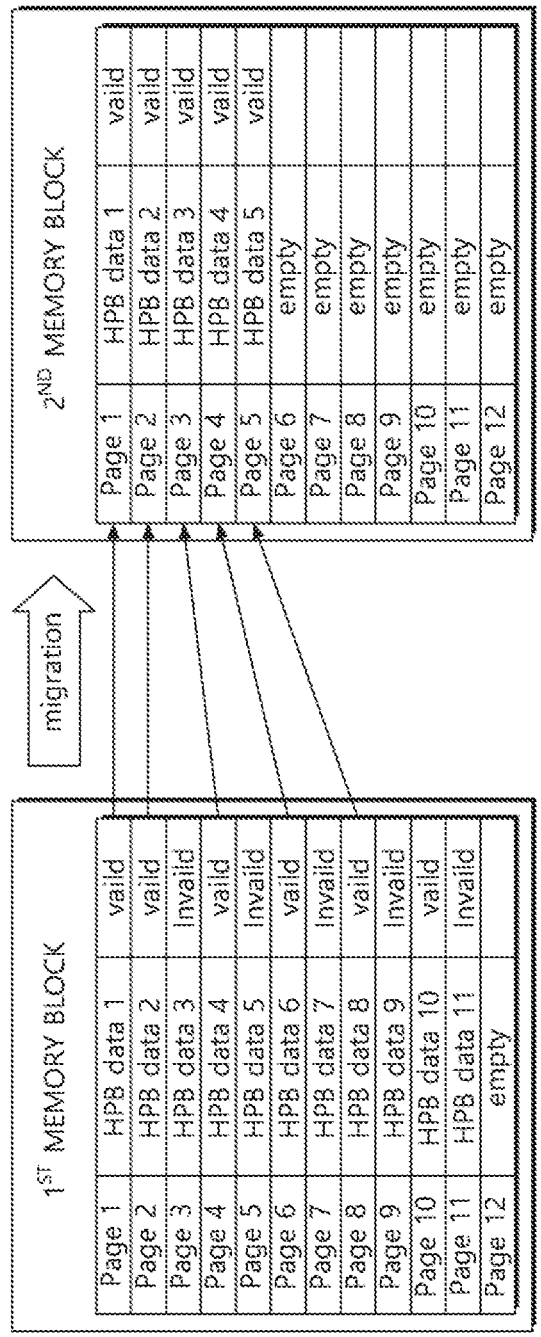

FIGS. 8A and 8B are diagrams illustrating an operation of the memory system 10 in accordance with an embodiment of the present disclosure.

FIG. 8A exemplifies the migration of the HPB data, which is stored in the first memory block, i.e., the initially assigned HPB storage region, to the second memory block, i.e., the later assigned HPB storage region. The memory system 10 may migrate, when the number of empty pages in the first memory block is less than a set threshold number, the HPB data, which is stored in the first memory block, to the second memory block. For example, the memory system may migrate, to empty pages within the second memory block, five pieces of most recently stored HPB data among a plurality of pieces of HPB data stored in valid pages within the first memory block. FIG. 8A exemplifies that the five pieces of most recently stored HPB data are in Pages 2, 4, 6, 8 and 10. The empty pages to which these five pieces of most recently stored HPB data are migrated are Pages 1-5 in the second memory block.

FIG. 8B exemplifies the migration of the HPB data, which is stored in the first memory block, i.e., the initially assigned HPB storage region, to the second memory block, i.e., the later assigned HPB storage region. The memory system 10 may migrate, when the number of empty pages in the first memory block is less than a set threshold number, the HPB data, which is stored in the first memory block, to the second memory block. For example, assuming that pieces of L2P map data corresponding to HPB data 1, HPB data 2, HPB data 4, HPB data 6 and HPB data 8 have respectively higher reference frequencies, the memory system 10 may migrate, to empty pages within the second memory block, HPB data 1 stored in Page 1, HPB data 2 stored in Page 2, HPB data 4 stored in Page 4, HPB data 6 stored in Page 6 and \HPB data 8 stored in Page 8 within the first memory block. As illustrated in FIG. 8B, those empty pages are Pages 1-5 in the second memory block.

Figure 9:
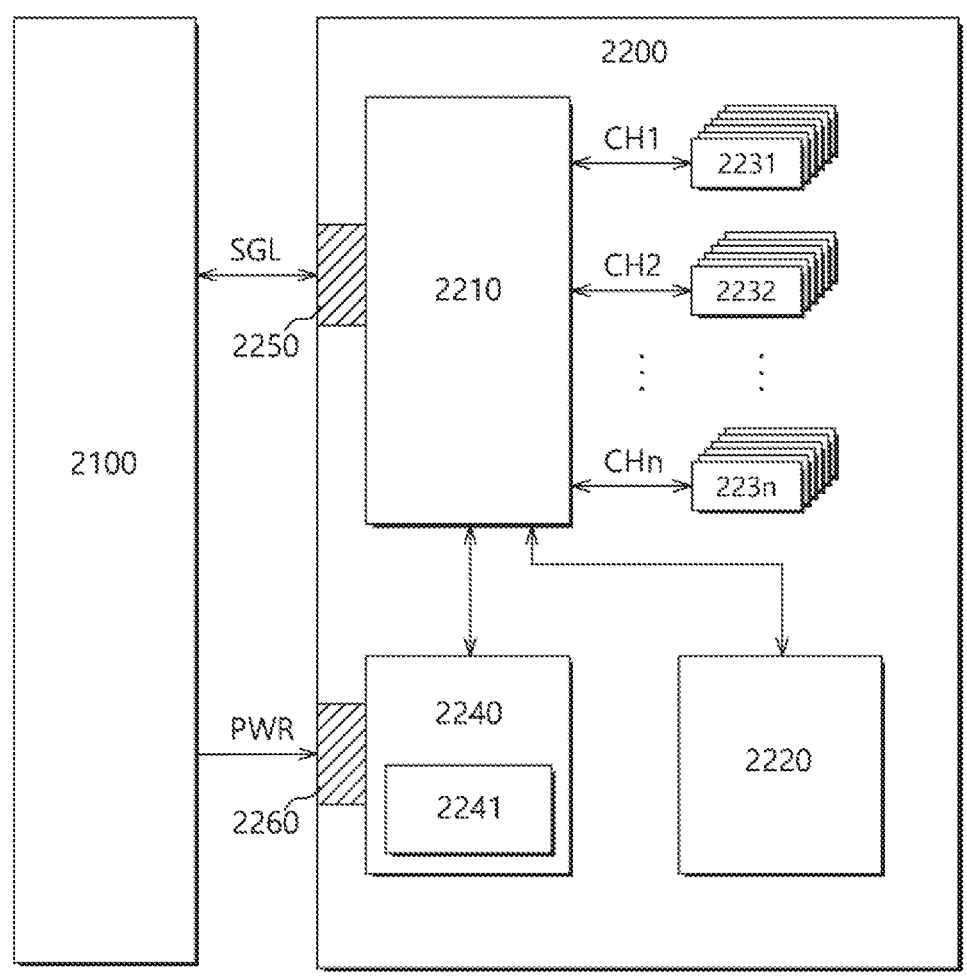
FIG. 9 is a diagram illustrating a configuration of a data processing system including a solid state drive (SSD) in accordance with an embodiment of the present disclosure.

FIG. 9 is a diagram illustrating a configuration of a data processing system including a solid state drive (SSD) in accordance with an embodiment of the present disclosure. Referring to FIG. 9, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200. The controller 2210 may be implemented and operate in the substantially same way as the controller 200 of FIG. 1.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1 to CHn, respectively. One or more nonvolatile memory devices may be coupled to a single channel. The nonvolatile memory devices coupled to a single channel may be coupled to the same signal bus and data bus.

The power supply 2240 may provide the inside of the SSD 2200 with power PWR inputted through the power connector 2260. The power supply 2240 may include an auxiliary power supply 2241. The auxiliary power supply 2241 may supply power to allow the SSD 2200 to be properly terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured as any of various types of connectors according to an interface scheme between the host 2100 and the SSD 2200.

Figure 10:
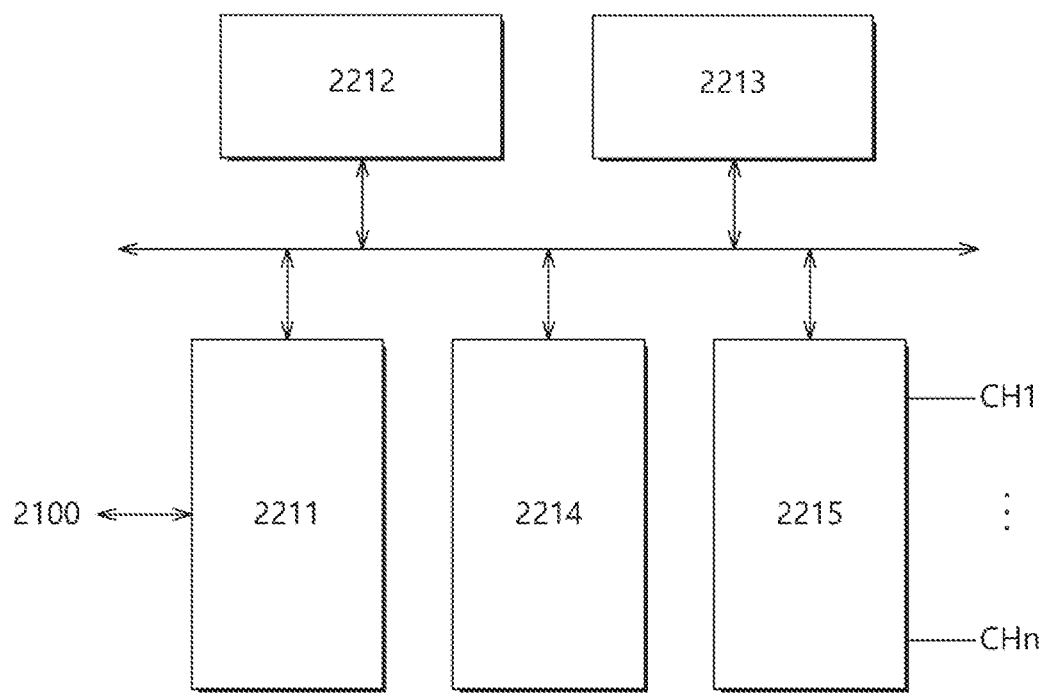
FIG. 10 is a diagram illustrating a configuration of a controller, such as that illustrated in FIG. 9.

FIG. 10 is a diagram illustrating a configuration of the controller illustrated in FIG. 9. Referring to FIG. 10, the controller 2210 may include a host interface 2211, a control component 2212, a random access memory 2213, an error correction code (ECC) component 2214, and a memory interface 2215.

The host interface 2211 may perform interfacing between the host 2100 and the SSD 2200 according to a protocol of the host 2100. For example, the host interface 2211 may communicate with the host 2100 through any of the following protocols: secure digital (SD), universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), and/or universal flash storage (UFS). In addition, the host interface 2211 may perform a disk emulating function of supporting the host 2100 to recognize the SSD 2200 as a general-purpose memory system, for example, a hard disk drive (HDD).

The control component 2212 may parse and process the signal SGL provided from the host 2100. The control component 2212 may control operations of internal function blocks according to firmware or software for driving the SSD 2200. The random access memory 2213 may operate as a working memory for driving such firmware or software.

The ECC component 2214 may generate parity data for data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 11:
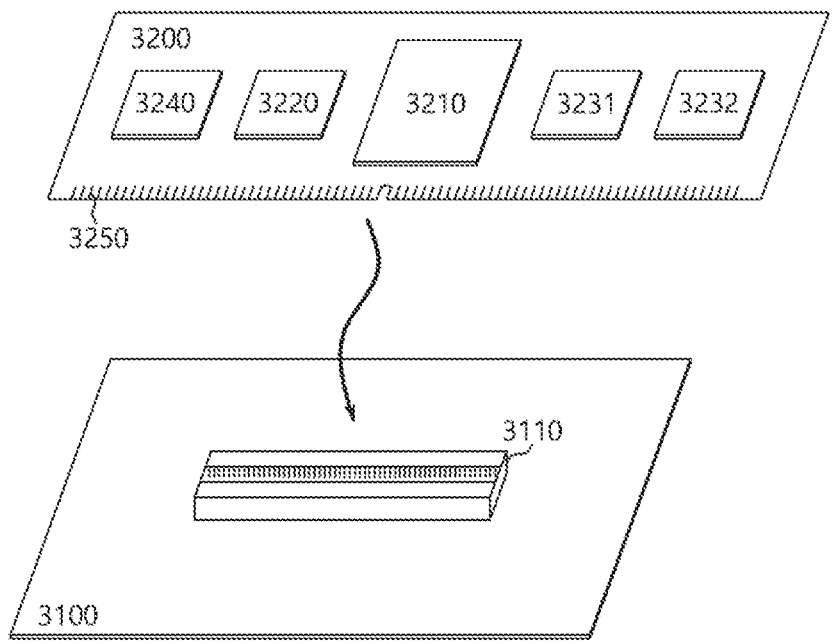
FIG. 11 is a diagram illustrating a configuration of a data processing system including a memory system in accordance with an embodiment of the present disclosure.

FIG. 11 is a diagram illustrating a configuration of a data processing system including a memory system in accordance with an embodiment of the present disclosure. Referring to FIG. 11, a data processing system 3000 may include a host 3100 and a memory system 3200.

The host 3100 may be configured in the form of a board such as a printed circuit board. Although not shown in FIG.

11, the host 3100 may include internal function blocks for performing functions of a host.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control overall operation of the memory system 3200. The controller 3210 may be configured in substantially same manner as the controller 2210 shown in FIG. 10.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide the inside of the memory system 3200 with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, data and the like, and power may be transferred between the host 3100 and the memory system 3200. The connection terminal 3250 may be configured as any of various types depending on an interface scheme between the host 3100 and the memory system 3200. The connection terminal 3250 may be disposed on or in any side of the memory system 3200.

Figure 12:
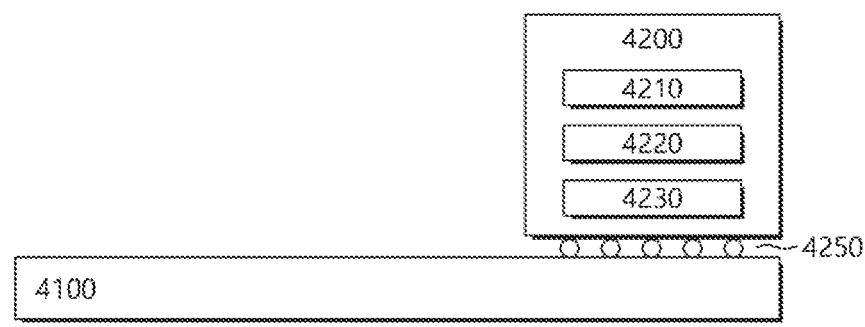
FIG. 12 is a diagram illustrating a configuration of a data processing system including a memory system in accordance with an embodiment of the present disclosure.

FIG. 12 is a diagram illustrating a configuration of a data processing system including a memory system in accordance with an embodiment of the present disclosure. Referring to FIG. 12, the data processing system 4000 may include a host 4100 and a memory system 4200.

The host 4100 may be configured in the form of a board such as a printed circuit board. Although not shown in FIG. 12, the host 4100 may include internal function blocks for performing functions of a host.

The memory system 4200 may be configured in the form of a package of a surface-mounting type. The memory system 4200 may be mounted on the host 4100 through solder balls 4250. The memory system 4200 may include a controller 4210, a buffer memory device 4220, and a nonvolatile memory device 4230.

The controller 4210 may control overall operation of the memory system 4200. The controller 4210 may be configured in substantially same manner as the controller 2210 shown in FIG. 10.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 13:
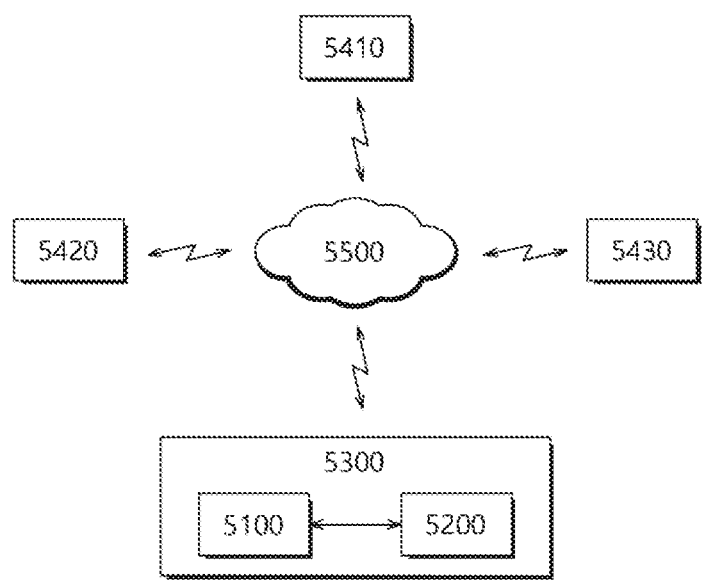
FIG. 13 is a diagram illustrating a configuration of a network system including a memory system in accordance with an embodiment of the present disclosure.

FIG. 13 is a diagram illustrating a configuration of a network system 5000 including a memory system in accordance with an embodiment of the present disclosure. Referring to FIG. 13, the network system 5000 may include a server system 5300 and a plurality of client systems 5410 to 5430 which are electrically coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured as the memory system 10 illustrated in FIG. 1, the memory system 2200 illustrated in FIG. 10, the memory system 3200 illustrated in FIG. 11, or the memory system 4200 illustrated in FIG. 12.

While certain embodiments have been illustrated and described, it will be understood by those skilled in the art that the disclosed embodiments are by way of example only. Accordingly, the present invention is not limited by or to the disclosed embodiments. Rather, the present invention encompasses all variations and modifications of any of the disclosed embodiments that fall within the scope of the claims including their equivalents.

What is claimed is:

1. An operating method of a controller for controlling a nonvolatile memory device including a plurality of memory blocks, the operating method comprising:

generating High Performance Booster (HPB) data consisting of Logical to Physical (L2P) map data and a bit for determining reliability of the L2P map data and storing the HPB data in at least one empty page in a first memory block;

receiving, from a host, an HPB request to transmit HPB data to the host, transmitting, to the host, HPB data corresponding to the HPB request among the HPB data stored in the first memory block, and invalidating, in the first memory block, the HPB data corresponding to the HPB request in response to the transmission;

assigning a second memory block as a migration destination, when a number of empty pages in the first memory block becomes less than a threshold number; and migrating HPB data, which is selected among the HPB data stored in the first memory block, to the second memory block, wherein at least a part of the HPB data is cached in a memory of the host, and wherein the selected HPB data is a fixed amount of HPB data that was most recently stored in the first memory block.

2. The operating method of claim 1, wherein the HPB data selected for migration excludes invalidated HPB data.

3. The operating method of claim 1, further comprising:
receiving a read command from the host; and
controlling the nonvolatile memory device to perform a read operation based on the L2P map data within the HPB data in the read command.

4. The operating method of claim 3, further comprising determining whether the L2P map data within the HPB data in the read command is reliable based on the bit for determining the reliability of the L2P map data, the bit being included in the read command,
- wherein the controlling of the nonvolatile memory device includes controlling the nonvolatile memory device to perform the read operation based on the L2P map data within the HPB data in the read command when the L2P map data within the HPB data in the read command is determined to be reliable according to the bit.

5. A memory system comprising:
- a nonvolatile memory device including a plurality of memory blocks; and
- a controller configured to control the nonvolatile memory device,
- wherein the controller is further configured to:
- generate High Performance Booster (HPB) data consisting of Logical to Physical (L2P) map data and a bit for determining reliability of the L2P map data and store the HPB data into at least one empty page in a first memory block;
- receive, from a host, an HPB request to transmit HPB data to the host, transmit, to the host, HPB data corresponding to the HPB request among the HPB data stored in the first memory block, and invalidate, in the first memory block, the HPB data corresponding to the HPB request in response to the transmission;
- assign a second memory block as a migration destination, when a number of empty pages in the first memory block becomes less than a threshold number; and
- migrate HPB data, which is selected among the HPB data stored in the first memory block, into the second memory block,
- wherein at least a part of the HPB data is cached into a memory of a host,
- and wherein the L2P map data included in the selected HPB data has a high reference frequency.

6. The memory system of claim 5, wherein the controller is configured to exclude invalidated HPB data from the selected HPB data.

7. The memory system of claim 5, wherein the controller is further configured to:
- receive a read command from the host; and
- control the nonvolatile memory device to perform a read operation based on the L2P map data within the HPB data in the read command.

8. The memory system of claim 7, wherein the controller is further configured to: determine whether the L2P map data within the HPB data in the read command is reliable based on the bit for determining the reliability of the L2P map data, the bit being included in the read command; and
- control the nonvolatile memory device to perform the read operation based on the L2P map data within the HPB data in the read command when the L2P map data within the HPB data in the read command is determined to be reliable according to the bit.

9. A method of operating a memory system, the method comprising:
- storing, in a first memory block in the memory system, high performance booster (HPB) data consisting of logical to physical (L2P) map data and a bit for determining reliability of the L2P map data;
- invalidating, in the first memory block, at least some of the HPB map data, which is provided to a host for caching in the host;
- performing an operation based on a physical address, which is retrieved from the HPB data cached in the host, in response to a request from the host; and
- migrating at least a portion of the valid HPB data from the first memory block to a second memory block.

* * * * *